United States Patent
Maubach

(10) Patent No.: US 10,814,458 B2
(45) Date of Patent: Oct. 27, 2020

(54) ARRANGEMENT FOR WORKING A TUBE END

(71) Applicant: Eaton Intelligent Power Limited, Dublin (IE)

(72) Inventor: Martin Maubach, Siegburg (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 202 days.

(21) Appl. No.: 15/956,776

(22) Filed: Apr. 19, 2018

(65) Prior Publication Data

US 2018/0304446 A1 Oct. 25, 2018

(30) Foreign Application Priority Data

Apr. 21, 2017 (GB) .................................. 1706377.7

(51) Int. Cl.
| | |
|---|---|
| B25B 5/08 | (2006.01) |
| B21D 19/12 | (2006.01) |
| B21D 19/16 | (2006.01) |
| B21D 41/02 | (2006.01) |
| B21D 19/06 | (2006.01) |
| B23Q 3/08 | (2006.01) |
| B21D 39/20 | (2006.01) |

(52) U.S. Cl.
CPC .............. *B25B 5/087* (2013.01); *B21D 19/06* (2013.01); *B21D 19/12* (2013.01); *B21D 19/16* (2013.01); *B21D 41/023* (2013.01); *B21D 41/025* (2013.01); *B23Q 3/082* (2013.01); *B21D 39/203* (2013.01); *B23Q 2703/02* (2013.01); *B23Q 2703/12* (2013.01)

(58) Field of Classification Search
CPC ........ B25B 5/087; B21D 41/21; B21D 41/25; B21D 41/023; B21D 19/06; B21D 19/12; B21D 19/16; B21D 39/203; B23Q 3/082; B23Q 2703/02; B23Q 2703/12
USPC ........................ 269/306, 294, 24–34, 20, 228
See application file for complete search history.

(56) References Cited

U.S. PATENT DOCUMENTS

| | | | | |
|---|---|---|---|---|
| 4,212,186 | A * | 7/1980 | Blattler | .................. B21D 39/20 72/393 |
| 4,860,144 | A * | 8/1989 | Berner | .................. B25J 19/063 361/1 |
| 2002/0079106 | A1 * | 6/2002 | Simpson | .................. E21B 7/20 166/380 |
| 2003/0047065 | A1 * | 3/2003 | Stoll | .................. F16B 15/2892 91/361 |

(Continued)

FOREIGN PATENT DOCUMENTS

| | | |
|---|---|---|
| CN | 202106042 U | 1/2012 |
| CN | 103362882 A | 10/2013 |

(Continued)

*Primary Examiner* — Tyrone V Hall, Jr.
*Assistant Examiner* — Khawaja H Samiullah
(74) *Attorney, Agent, or Firm* — Leydig, Voit & Mayer, Ltd.

(57) ABSTRACT

An arrangement for working a tube end includes: an operating cylinder with a piston displaceable along an longitudinal axis; and a tube mounting, a tool holder being provided at an end of the piston facing the tube mounting. The operating cylinder is provided as a tandem cylinder. At least two cylinder stages are offset along the longitudinal axis. The piston includes connected piston segments, each piston segment being allocated to a cylinder stage.

12 Claims, 3 Drawing Sheets

(56) References Cited

U.S. PATENT DOCUMENTS

| | | | |
|---|---|---|---|
| 2003/0190419 A1* | 10/2003 | Katagami | G02F 1/133516 427/240 |
| 2004/0065446 A1* | 4/2004 | Tran | E21B 47/12 166/384 |
| 2011/0226034 A1* | 9/2011 | Ohara | B21D 41/028 72/391.2 |
| 2017/0067573 A1* | 3/2017 | Herman | F16K 31/508 |

FOREIGN PATENT DOCUMENTS

| | | |
|---|---|---|
| DE | 102013005738 B4 | 2/2015 |
| EP | 0284773 A2 | 10/1988 |

\* cited by examiner

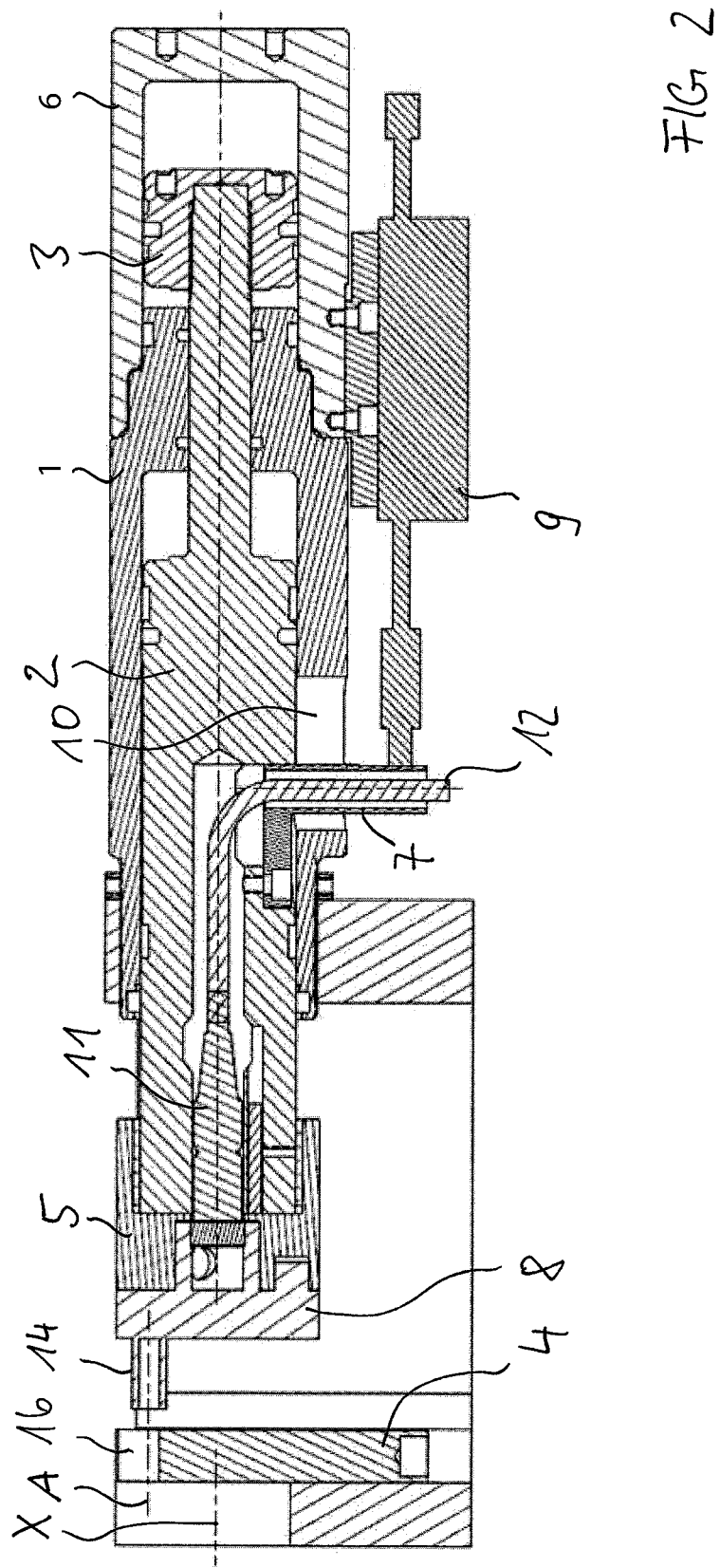

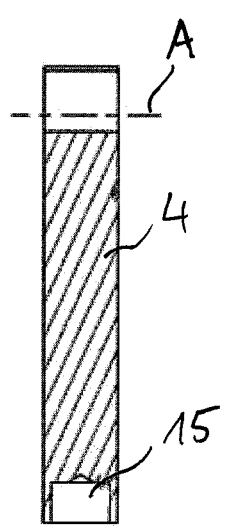
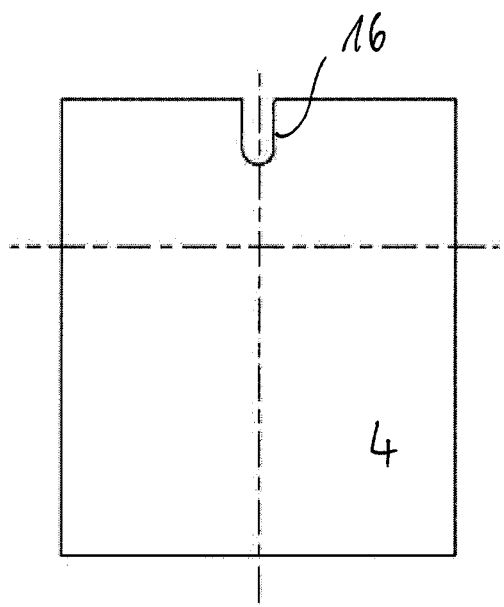
FIG. 3A
FIG. 3B
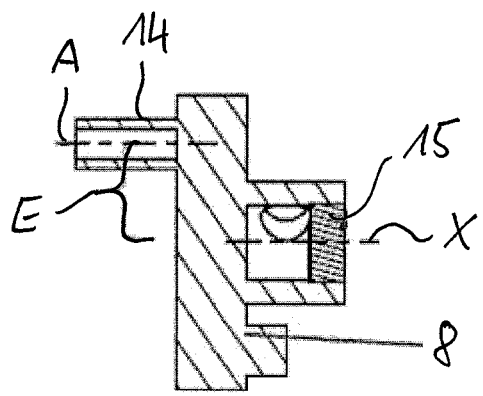
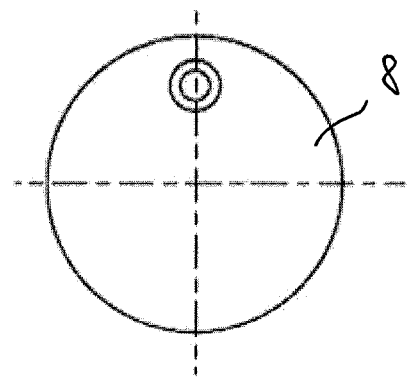
FIG. 4A
FIG. 4B

ARRANGEMENT FOR WORKING A TUBE END

CROSS-REFERENCE TO PRIOR APPLICATION

Priority is claimed to British Patent Application No. GB 1706377.7, filed on Apr. 21, 2017, the entire disclosure of which is hereby incorporated by reference herein.

FIELD

The invention relates to an arrangement for working a tube end, the arrangement comprising an operating cylinder with a piston displaceable along an longitudinal axis, and a tube mounting, wherein a tool holder is provided at an end of the piston facing the tube mounting.

BACKGROUND

In the art of working a tube end or a tube near its end, for example in residential plumbing applications, it has been a common expedient to use machines in which clamping means are provided to hold the tubing to be worked and a tool is mounted to a plunger supported coaxially in front of the end of the tube to be worked, and the tool, for example by rotating a threaded member in a correspondingly threaded support bracket, or by means of a hydraulic cylinder, is moved with force towards the end of the tube, which is thus worked, i.e. formed in a certain way, for example by flaring the tube end or by expanding the tube. A further typical application is to fit a cutting ring onto the tube end for later solderless olive type tube fitting, for example.

A problem of such machines is addressed in DE 10 2013 005 738 B4, namely the working of a tube end, which is curved, particularly by 180 degrees with a small radius. Such a tube cannot be clamped as the second leg of the curved tube does not fit over the bulky tooling. The solution proposed is to provide a gap in the machine casing to allow the second leg of the tube to be accommodated in that gap. A drawback is that a less powerful hydraulic cylinder must be used. If two parallel hydraulic cylinders are used to compensate the loss of power, the control of the independently powered hydraulic cylinders is complicated and any uneven movement of the two parallel cylinders may cause a damage of the cylinders, like for example, a leak.

SUMMARY

In an embodiment, the present invention provides an arrangement for working a tube end, the arrangement comprising: an operating cylinder with a piston displaceable along an longitudinal axis; and a tube mounting, a tool holder being provided at an end of the piston facing the tube mounting, wherein the operating cylinder comprises a tandem cylinder, wherein at least two cylinder stages are offset along the longitudinal axis, and wherein the piston comprises connected piston segments, each piston segment being allocated to a cylinder stage.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2 shows the view of FIG. 1 with the arrangement according to the invention in a second working position;

FIGS. 3A and 3B show different views of a tube mounting of the embodiment of FIG. 1 in detail; and FIGS. 4A and 4B show different views of a tool as attached to the embodiment of FIG. 1 in detail.

DETAILED DESCRIPTION

Figure 1:
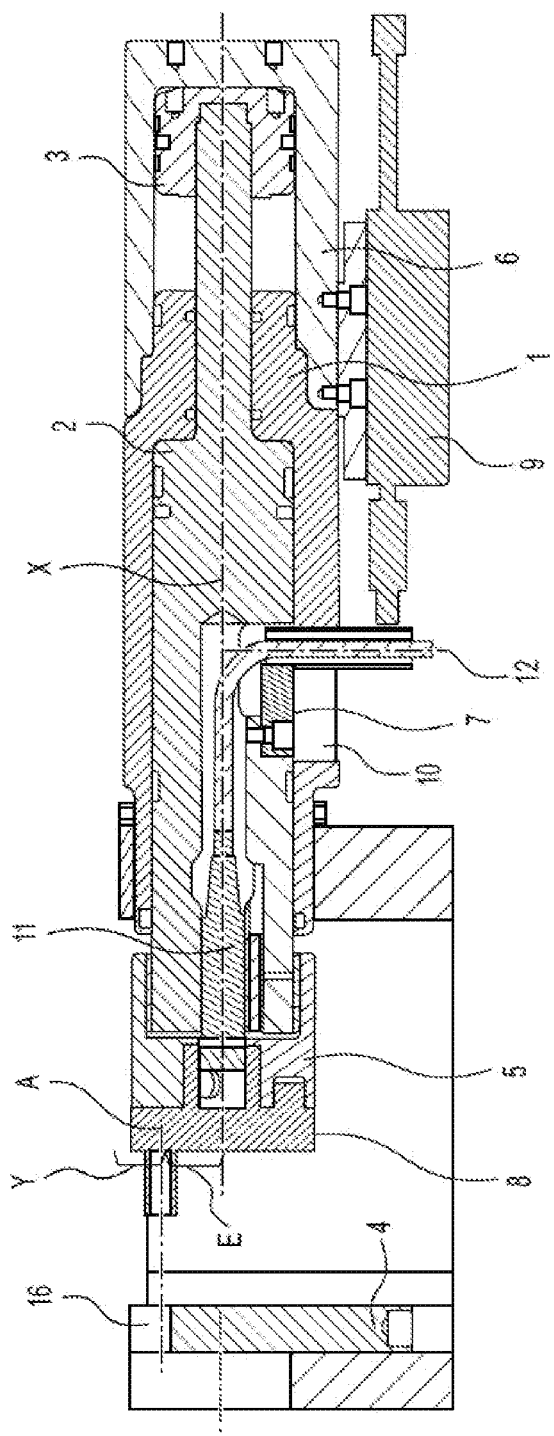
FIG. 1 shows a sectional view of an embodiment of an arrangement according to the invention in a first working position.

A first arrangement according to the invention comprises an operating cylinder with a piston displaceable along a longitudinal axis, and a tube mounting. The tube mounting may be used to fix a tube or rather an end portion of the tube in such a way that the tube is axially aligned with the longitudinal axis of the operating cylinder. A tool holder is provided at an end of the piston facing the tube mounting, for attaching a tool for working the tube end, which can be, for example, a tool with a fitting cone for attaching a cutting ring onto the tube end for later solderless olive type tube fitting. According to the invention, the operating cylinder is provided as a tandem cylinder, wherein at least two cylinder stages are offset along the longitudinal axis, and wherein the piston comprises connected piston segments, wherein each piston segment is allocated to a cylinder stage. Preferably, each cylinder stage is adapted to impress a force onto the respective piston segment. The tandem cylinder is advantageously adapted to exert high hydraulic forces, but is radially compact. The control of the hydraulic power does not have any special requirements in regard of the two cylinder stages. Whether one stage receives less hydraulic pressure, or receives the hydraulic pressure not exactly at the same time as the other stage, will neither do any harm to the arrangement nor will the function be affected in any way. The comparably easy control of the hydraulic pressure to the cylinder stages is an advantage of the tandem cylinder. The tandem cylinder will usually have two cylinder stages. However, a higher number of cylinder stages offset along the longitudinal axis are as well conceivable and shall be enclosed in the scope of the present invention.

An alternative second arrangement for working a tube end, according to the invention, which accomplishes the above objective as well, comprises as well an operating cylinder with a piston displaceable along a longitudinal axis, and a tube mounting, wherein a tool holder is provided at an end of the piston facing the tube mounting. According to the invention, the alternative arrangement is characterized by the piston comprising an anti-twist protection device to prevent the piston from twisting relative to the operating cylinder. It is an advantage of the alternative arrangement that a tool attached to the tool holder may beneficially have an operating axis which is radially offset with respect to the longitudinal axis. This offset allows a curved tube with a smaller bending radius to be attached to the tube mounting. The anti-twist protection device advantageously secures the eccentrically offset operating axis of the tool, which would otherwise not be stationary if the piston twisted.

The features of the alternative second arrangement are preferably additional features of the first arrangement. The following preferred embodiments thus refer to each one of the first and second arrangement, if applicable, as well as to a combination of both.

According to a preferred embodiment, the anti-twist protection device protrudes in radial direction from the piston through a clearance in a wall of the cylinder, the clearance running axially along the wall of the cylinder.

According to a further preferred embodiment, the tool holder is equipped with at least one sensor for detecting at least one characteristic of the attached tool. A first characteristic is, for example, whether a tool is attached or not. Further, a kind and/or a dimension of the tool are preferably characteristics detected by the sensor.

According to a further preferred embodiment, a signal line is provided, which signal line runs from the sensor through the piston and the anti-twist protection device out of the operating cylinder. A power supply line is furthermore preferably provided, which is running in parallel to the signal line.

According to a further preferred embodiment, a position sensor is provided to detect a longitudinal position of the anti-twist protection device. An advantage of the embodiment is that the position sensor, which is necessary to detect a position of the piston inside the cylinder, may be arranged next to the operating cylinder, as the position of the piston may beneficially be derived by detecting the position of the anti-twist protection device, which is attached to the piston. The arrangement may thus be shorter along the longitudinal axis, compared to a position sensor which is arranged at the end of the cylinder.

The invention will now be further described with respect to a preferred embodiment, which is depicted in the attached drawings. The description is merely exemplary and does not limit the scope of the invention.

In the FIGS. 1 and 2, respectively, a sectional view along a longitudinal axis X of an embodiment of an arrangement for working a tube end according to the invention is shown. FIG. 1 shows a first working position, with a piston 2, 3 retracted, and, FIG. 2 shows a second working position, with the piston 2, 3 extended from an operating cylinder 1, 6. These figures will be described together.

The piston 2, 3 is displaceable along the longitudinal axis X, and a tube mounting 4 is adapted to fix a tube end in such a way that it is axially aligned in parallel to the longitudinal axis. A tool holder 5 is provided at an end of the piston 2, 3 facing towards the tube mounting 4.

The operating cylinder 1, 6 is provided as a tandem cylinder, wherein a first cylinder stage 1 and a second cylinder stage 6 are offset along the longitudinal axis X, and wherein the piston 2, 3 comprises a first piston segment 2 connected to a second piston segment 3. The first piston segment 2 is allocated to the first cylinder stage 1 and the second piston segment 3 is allocated to the second cylinder stage 6. Each cylinder stage 1, 6 is adapted to impress a force onto the respective piston segment 2, 3.

The piston 2, 3 comprises an anti-twist protection device 7 to prevent the piston 2, 3 from twisting relative to the operating cylinder 1, 6. In the embodiment shown the anti-twist protection devices protrudes in radial direction from the first piston segment 2 through a clearance 10 in a wall of the first cylinder stage 1. The tool holder 5 is equipped with at least one sensor 11 for detecting at least one characteristic of an attached tool 8. A signal line 12 is provided, which is running from the sensor 11 through the first piston segment 2 and the anti-twist protection device 7 out of the operating cylinder 1, 6. A power supply line may be provided to run in parallel of the signal line 12. A position sensor 9 is provided to detect a longitudinal position of the anti-twist protection device 7.

A tool 8 is attached to the tool holder 5, and the tool 8 comprises an operating axis A which is radially offset with respect to the longitudinal axis X. The offset or eccentricity is shown and marked with E. Y denotes the minimal distance that two legs of a curved tube must have, in order to fix the tube to the tube mounting 4.

With respect to the FIGS. 3A and 3B, the tube mounting 4 is further described, which is formed as a plate with a notch 16 into which the tube is fixed. The tube mounting 4 comprises an electronic data carrier 15. A sensor may advantageously read the information from the data carrier 15, which may for example contain a caliber of the notch 16.

With respect to the FIGS. 4A and 4B, the tool 8 is further explicated. The tool 8 comprises a fitting cone 14 for attaching a cutting ring onto the tube end for later solderless olive type tube fitting. The fitting cone 14 has an operating axis A, which is offset about an eccentricity E from the longitudinal axis X. A data carrier 15 is attached to the tool 8, which is read by the sensor 11 (FIG. 1) inside the piston 2, 3. The kind of tool and/or a dimension of the tool 8 may, for example, be stored on the data carrier 15.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 Operating cylinder, first cylinder stage
2 Piston, first piston segment
3 Piston, second piston segment
4 Tube mounting
5 Tool holder
6 Operating cylinder, second cylinder stage
7 Anti-twist protection device
8 Tool
9 Position sensor
10 Clearance
11 Sensor for tool detection
12 Signal line and/or power supply line
14 Fitting cone 15 Data carrier
16 Notch
X Longitudinal axis
A Operating axis of the tool
E Eccentricity, distance from longitudinal to operating axis
Y Minimal distance between tubes

What is claimed is:

1. An arrangement for working a tube end, the arrangement comprising:
   an operating cylinder with a piston displaceable along a longitudinal axis; and
   a tube mounting, a tool holder being provided at an end of the piston facing the tube mounting,
   wherein the operating cylinder is a tandem cylinder,
   wherein at least two cylinder stages are offset along the longitudinal axis,
   wherein the piston comprises connected piston segments, each piston segment being allocated to a corresponding cylinder stage,
   wherein a tool is attached concentrically to the tool holder so as to be co-axial with the tool holder along the longitudinal axis and
   wherein the tool comprises an operating axis which is radially offset with respect to the longitudinal axis.

2. The arrangement according to claim 1, wherein each cylinder stage is configured to impress a force onto the respective piston segment.

3. The arrangement according to claim 1, wherein the piston comprises an anti-twist protection device configured to prevent the piston from twisting relative to the operating cylinder.

4. The arrangement according to claim 3, wherein the anti-twist protection device protrudes in a radial direction from the piston through a clearance in a wall of the cylinder, the clearance running axially along the wall of the cylinder.

5. The arrangement according to claim 4, wherein the tool holder is equipped with at least one sensor configured to detect at least one characteristic of an attached tool.

6. The arrangement according to claim 5, further comprising a signal line that runs from the at least one sensor through the piston and the anti-twist protection device out of the operating cylinder.

7. The arrangement according to claim 6, further comprising a power supply line which runs in parallel to the signal line.

8. The arrangement according to claim 3, further comprising a position sensor configured to detect a longitudinal position of the anti-twist protection device.

9. An arrangement for working a tube end, the arrangement comprising:
   an operating cylinder with a piston displaceable along a longitudinal axis; and
   a tube mounting, a tool holder being provided at an end of the piston facing the tube mounting,
   wherein the operating cylinder is a tandem cylinder,
   wherein at least two cylinder stages are offset along the longitudinal axis,
   wherein the piston comprises connected piston segments, each piston segment being allocated to a corresponding cylinder stage,
   wherein the piston comprises an anti-twist protection device configured to prevent the piston from twisting relative to the operating cylinder,
   wherein the anti-twist protection device protrudes in a radial direction from the piston through a clearance in a wall of the cylinder, the clearance running axially along the wall of the cylinder,
   wherein the tool holder is equipped with at least one sensor configured to detect at least one characteristic of an attached tool, and
   wherein the arrangement further comprises a signal line that runs from the at least one sensor through the piston and the anti-twist protection device out of the operating cylinder.

10. The arrangement according to claim 9, further comprising a power supply line which runs in parallel to the signal line.

11. An arrangement for working a tube end, the arrangement comprising: an operating cylinder with a piston displaceable along a longitudinal axis; and a tube mounting, a tool holder being provided at an end of the piston facing the tube mounting, wherein the operating cylinder is a tandem cylinder, wherein at least two cylinder stages are offset along the longitudinal axis, wherein the piston comprises connected piston segments, each piston segment being allocated to a corresponding cylinder stage, wherein a tool is attached to the tool holder, wherein the tool comprises an operating axis which is radially offset with respect to the longitudinal axis, wherein the piston comprises an anti-twist protection device configured to prevent the piston from twisting relative to the operating cylinder, wherein the anti-twist protection device protrudes in a radial direction from the piston through a clearance in a wall of the cylinder, the clearance running axially along the wall of the cylinder, wherein the tool holder is equipped with at least one sensor configured to detect at least one characteristic of an attached tool, and wherein the arrangement further comprises a signal line that runs from the at least one sensor through the piston and the anti-twist protection device, out of the operating cylinder.

12. The arrangement according to claim 11, further comprising a power supply line which runs in parallel to the signal line.

* * * * *